March 23, 1954

R. R. CROOKSTON 2,672,886

AIR PILOT VALVE

Filed Feb. 7, 1952

3 Sheets-Sheet 1

INVENTOR.
ROBERT R. CROOKSTON,

BY

ATTORNEY.

Patented Mar. 23, 1954

2,672,886

UNITED STATES PATENT OFFICE 2,672,886

AIR PILOT VALVE

Robert R. Crookston, Houston, Tex., assignor, by mesne assignments, to Standard Oil Development Company, Elizabeth, N. J., a corporation of Delaware Application February 7, 1952, Serial No. 270,467

10 Claims. (Cl. 137—652)

This application is directed to an air pilot valve. The valve has the advantage that a small movement of an activating member causes positive actuation of a main valve.

Figure 1:
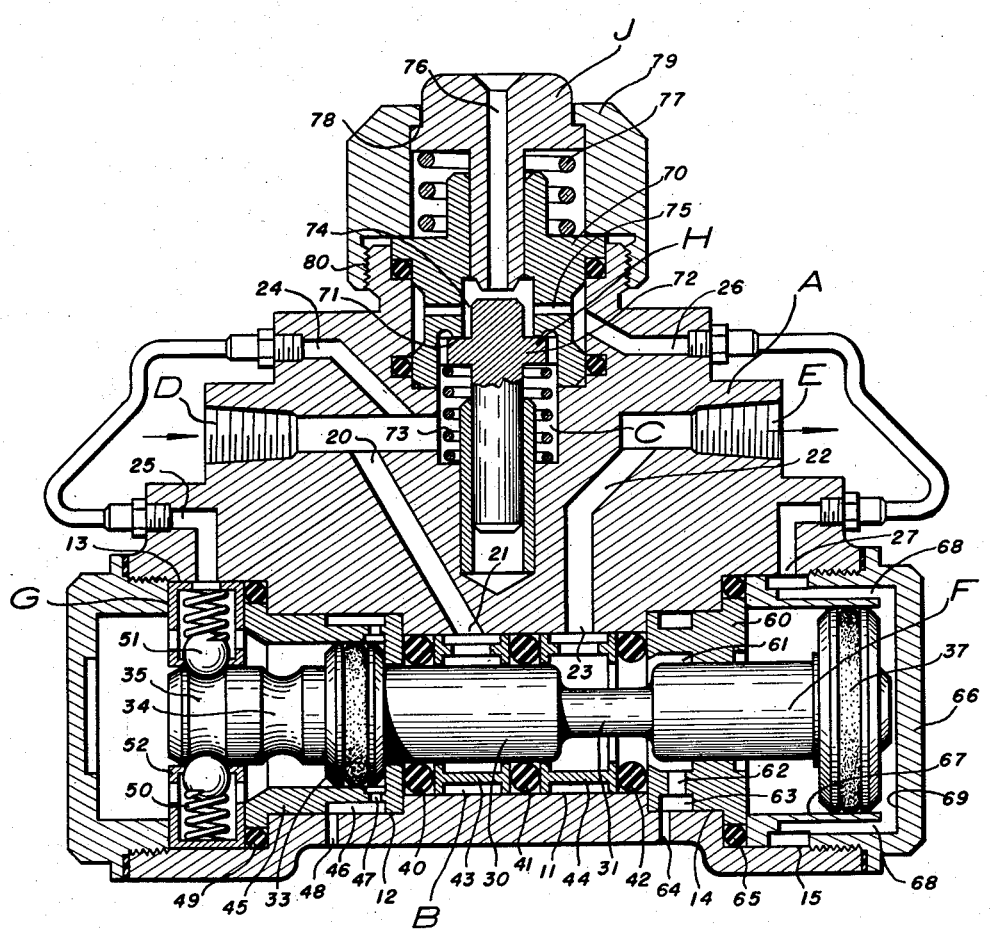
Figure 2:
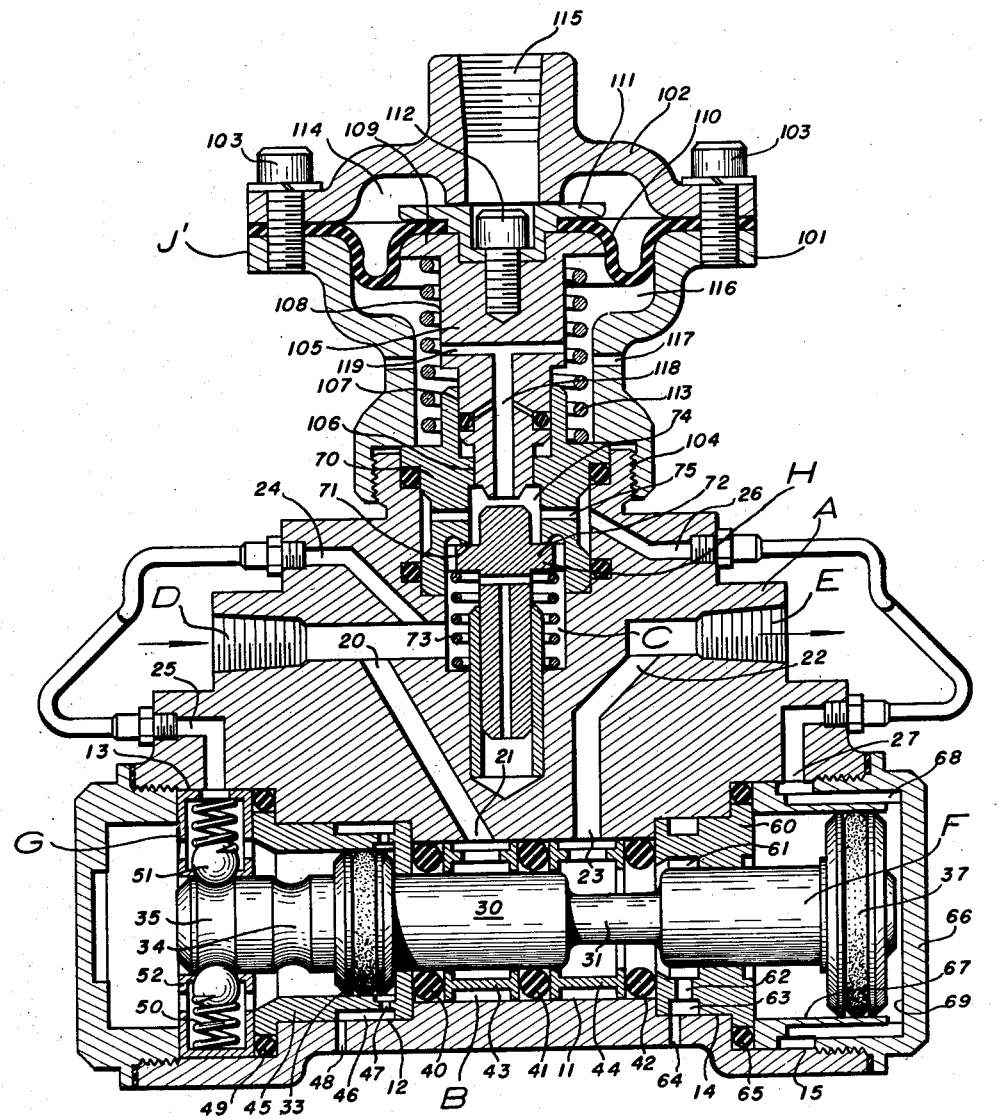
Figure 3:
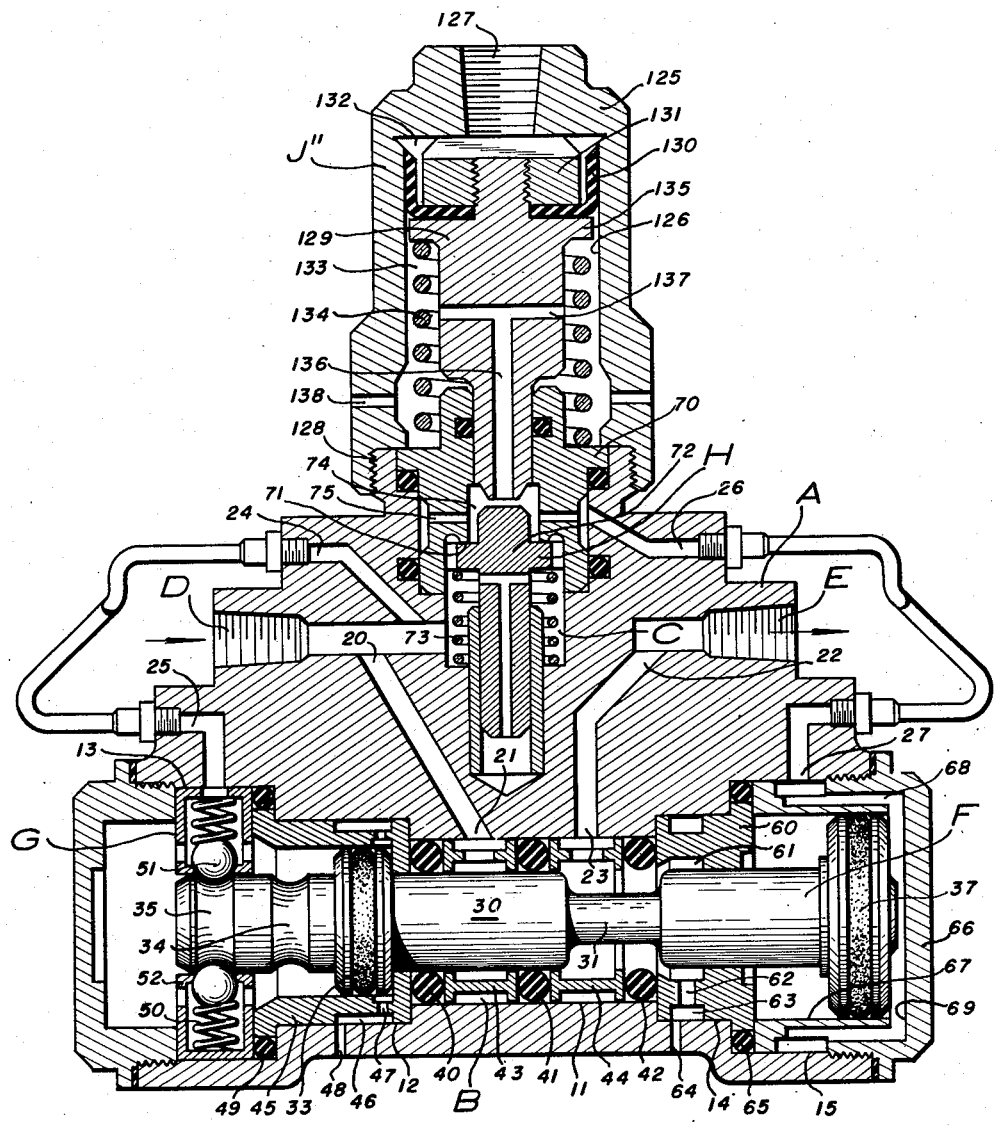

The invention will now be described in detail in conjunction with the drawing in which Fig. 1 is an elevation, partly in section, showing one embodiment of the present invention;

Fig. 2 is an elevation, partly in section, showing another embodiment of the present invention; and Fig. 3 is an elevation, partly in section, showing another embodiment of the present invention.

In the drawing the principal parts or assemblies are designated by letters and lesser parts by reference numerals. Like parts of the three different embodiments are designated by like reference characters.

Description of Figure 1

Turning now specifically to the drawing and first to Fig. 1, a valve body A has a cylindrical passage B and a pilot valve receiving cavity C. The valve body also has an air inlet port D and an air delivery port E.

The passage B has an intermediate cylindrical section 11 which is connected to a larger left end section 12 which, in turn, connects to a larger extreme end section 13. The section 11 also connects to a larger right end section 14 which, in turn, connects to a still larger end section 15.

Connecting to inlet D is a passage 20 which discharges through opening 21 of wall 11 of central passage B. A passage 22 connects to delivery port E and discharges through port 23 through the wall 11 of the central passage. Ports 21 and 23 are longitudinally spaced. Passage 24 connects inlet port D through wall portion 13 discharging through opening 25 into the central passage. A passage 26 connects pilot valve cavity C to the right end portion of the central passage discharging through opening 27 in wall portion 15.

Slidably mounted in cylindrical passage B is a dumbbell shaped piston assembly F. The central portion of piston assembly F has a cylindrical wall 30 in which is a wide annular groove defined by wall portion 31. The left end of piston F has a groove in which is a sealing O-ring 33 and annular grooves 34 and 35. The right end portion of piston F is of larger diameter than the remainder thereof and has a groove in which is arranged a sealing O-ring 37.

Spaced sealing O-rings 40, 41 and 42 are arranged in the wall portion 11 of passage B and spaced apart by spacing members 43 and 44. The sealing O-rings 40, 41 and 42 are arranged so that when the piston is in its right end position, as shown in the drawing, opening 21 is sealed from opening 23, but when the piston is moved to its left end position the openings 21 and 23 are in communication through grooved portion 31 of piston F. In other words, when piston F is in its left end position the groove defined by wall portion 31 permits air to flow from inlet port D to delivery port E.

O-ring 40 is kept from moving to the left by the annular shaped insert member 45 which has an exhaust groove 46 and an exhaust port 47 in communication with an exhaust port 48 in the valve body A which allows air which has leaked past either seal 40 or seal 33 to discharge to the atmosphere. The left end of member 45 has an O-ring 49 sealing the space between it and body A.

Arranged to the left of seal 49 is a releasable locking assembly G consisting of springs 50, locking balls 51 and retaining member 52. The locking balls 51 are proportioned to fit into groove 34 when the piston is in its extreme left position and groove 35 when the piston is in its extreme right position.

O-ring 42 is kept from moving to the right by retaining member 60 which is provided with bleeder grooves 61 and 63 connected by port 62 and communicating through ports 64 of body A to the atmosphere. The space between the right end exterior surface of member 60 and wall 15 of passage B is sealed by O-ring 65. Adjacent member 60 is another annular retaining member 66 having an interior cylindrical wall 67 with which O-ring 37 of piston F makes sliding contact and with the exterior surface forming passages 68 for taking air from passage 26 and allowing it to fill the space 68 between the right end of piston F and the wall 69 of valve body A.

Mounted in the cavity C is a pilot valve assembly H and a pilot valve operating member J. The pilot valve assembly H consists of a valve body 70 having a valve seat 71 and a valve member 72 with a spring 73 arranged around the valve member to bias it against the valve seat. Above valve seat 71 valve body 70 has a cylindrical passage which is of larger diameter than the diameter of valve member 72 at this point thereby making a space 74 through which air may flow. Space 74 communicates through port 75 to passage 26 and hence with the space 68 to the right of piston F. Slidably arranged in the cylindrical opening is the valve operating member J which has a passage 76, the entrance to which communicates with space 74 when member J is in its upper position and the entrance to which is sealed by contact with valve member 72 when member J is pushed down to make such contact.

As stated in the preceding paragraph, member J is slidably mounted in pilot valve body 70. The member J is biased upwardly by spring 77 with its upward movement limited by contact of shoulder 78 with the upper portion of retaining annulus 79 which is secured to valve body A by screw threads 80.

*Operation of Fig. 1*

In the embodiment of Fig. 1 pilot valve actuating member J is in its upper position and out of contact with pilot valve member 72 as long as the force exerted by the spring 73 is greater than any force exerted against valve operating member J. However, when a mechanical force is exerted against member J great enough to overcome the force of spring 77, member J moves downwardly and its lower end comes into contact with pilot valve 72 thus sealing the lower end of bleeder port 76 and also forcing the pilot valve downwardly away from valve seat 71. When pilot valve 72 moves away from seat 71 it allows compressed air to pass from inlet D through cavity C and thence through passages 75, 26, 27 and 68 so that the compressed air acts against the area of the right-hand end of piston F and forces it to its left position. The air pressure exerted against the right end of the piston is great enough to overcome the releasable locking assembly G and when the piston is moved to its left position it is locked by the locking balls 51 seating in the groove 34. When the force exerted against pilot valve actuating valve J is released, member J is forced into its upper position by spring 77 first allowing pilot valve member 72 to seat on seat 71 and then exposing the lower end of bleeder passage 76 so that air can bleed from the cavity 68 adjacent the right-hand end of piston F to the atmosphere by way of passages 68, 27, 26, 75 and 76. The bleeding of the air from the right-hand end of the piston allows the compressed air pressure which is continually exerted against the left-hand end of the piston to force the piston from its left position to its right position, this force being great enough to overcome the locking assembly G so that the piston is moved from the position where balls 51 engage groove 34 to the position where they engage groove 35.

*Description of Fig. 2*

Another embodiment of the present invention is shown in Fig. 2. The embodiment of this figure differs from that of Fig. 1 in the design of the pilot valve operating mechanism. The valve body A, piston F and pilot valve H are identical to that of Fig. 1 and will not be again described.

In the embodiment of Fig. 2 the assembly J' has a housing consisting of members 101 and 102 fastened together by suitable means such as cap screws 103. The housing member 101 is secured to valve body A by screw threads 104. The valve actuating member 105 is a longitudinally extending symmetrical member having a plurality of coaxial cylindrical surfaces 106, 107 and 108 which increases in diameter in a stepwise fashion with the end of the member terminating in flange 109. The upper end of member 105 is secured to the center part of diaphragm 110 by means of a circular retaining member 111 and cap screw 112. Spring 113 is arranged around member 105 to bias it upwardly.

As will be seen in the drawing, the diaphragm 110 is in the shape of an annulus with its inner edge secured in an air-tight manner to member 105 and its outer periphery sealed in a fluid-tight manner between members 101 and 102. Diaphragm 110 with members 101 and 102 forms an upper chamber 114 having an inlet 115 and a lower chamber 116. The lower chamber is open to the atmosphere through bleeder ports 117.

Member 105 has a bleeder passage 118 having an entrance at its lower end adjacent pilot valve member 72 and discharging through transversely extending passage 119 through wall 108 at a point near the bleeder port 117.

*Operation of Fig. 2*

In the embodiment of Fig. 2 pilot valve actuating member 105 is in its upper position and out of contact with pilot valve member 72 as long as the force exerted by spring 113 is greater than the force exerted by air in space 114 against the diaphragm 110 and exposed surface of retaining member 111. However, when the force exerted by the compressed air is great enough to overcome the force of the spring, actuating member 105 moves downwardly and its lower end comes in contact with pilot valve 72 forcing the pilot valve downwardly away from valve seat 71. Thus the operations of the pilot valve 71 and piston F are the same as in the embodiment of Fig. 1 heretofore described. When the pressure in chamber 114 is released, spring 113 forces member 105 upwardly allowing pilot valve member 72 to make a seal with its seat 71 and as member 105 moves out of contact with pilot valve 72, the lower end of passage 118 is exposed thereby bleeding air from the passages connected with it; namely, from the space 68 to the right of piston F by means of passages 27 and 26 and port 75.

*Description of Fig. 3*

Another embodiment of the present invention is shown in Fig. 3. This embodiment has a main valve body A, pilot valve H and piston F identical to that of the precedingly described embodiments of Figs. 1 and 2. The embodiment of Fig. 3 differs from that of the embodiments of Figs. 1 and 2 in the means for operating the pilot valve actuator.

In the embodiment of Fig. 3 the pilot valve actuator assembly J'' has a body 125 with its interior wall 126 of a generally cylindrical shape with the upper end having an inlet 127 for connecting to a suitable source of compressed air and having its lower end secured to valve body A through screw threads 128. The actuator member 129 has its upper end supplied with what in effect is a piston consisting of flexible sealing cup member 130 held in place by retainer nut 131. Sealing cup 130 makes a seal with the cylindrical wall 126 and cavity 132, which is above the sealing cup 130, is sealed from cavity 133 which is below the sealing cup. Spring 134 is arranged around actuating member 129 with its upper end in contact with shoulder 135 of actuating member 129 thereby biasing the actuating member upwardly away from pilot valve 72. The lower portion of actuating member 129 has a central passage 136 with an opening adjacent pilot valve member 72 and discharging through side passages 137 into chamber 133. Chamber 133 is in communication with the atmosphere through bleeder ports 138.

Operation of Fig. 3

In the actuation of the device of Fig. 3, the actuating member 129 is moved downwardly when the force exerted by compressed air in chamber 132 against the upper end of the piston is greater than the force exerted by spring 134. When the actuating member 129 moves downwardly until its lower end is in contact with pilot valve 72, the lower end of passage 136 is sealed off and as pilot valve 72 is pushed away from its seat 71 air is allowed to pass from inlet D through pilot valve H and thence through passages 75, 26, 27, and 68 so that the compressed air has access to the right end of piston F and forces it to its left position. When the compressed air pressure in chamber 132 of actuating assembly J' is released spring 134 forces actuating member 129 upwardly thereby allowing pilot valve 72 first to seal against its seat 71 and then bringing the lower end of actuating member 129 out of contact with pilot valve 72 thus allowing compressed air to bleed from chamber 68 by means of passages 27, 26, 75, 136, 137, chamber 133 and port 138 to atmosphere; this release of pressure on the right end of piston F allows the pressure which is exerted continually against the left of the piston to force the piston F to its right position.

Summary

It is an advantage of the device of the present invention that a very small movement of the actuating member is sufficient to cause positive movement of piston F from one position to the other position. By way of example, the total movement of the actuating member may be less than .005 inch.

As will be obvious, the embodiment of Fig. 1 is actuated mechanically by longitudinal movement of the actuating member. The embodiment of Fig. 2 where a diaphragm furnishes the power for moving the actuating member allows the volume of the chamber above the diaphragm to be used as a timing device. By suitable design of the diaphragm, such as shown in my copending application Serial No. 226,205, filed May 14, 1951, the friction and hysteresis in the diaphragm can be very small. The embodiment of Fig. 3 is actuated by compressed air and the volume above the piston can be used as a timing device in uses where a low hysteresis may not be a requirement. In the embodiment of Fig. 3, the build up in pressure in chamber 132 from a remote or small volume source actuates member 129 which in turn brings about the snap action of piston F which in turn enables large volumes of air to be delivered through the valve body A.

Having fully described the several embodiments of the present invention, what I desire to claim is:

1. A pilot valve comprising, in combination, a valve body having a cylindrical passage with an intermediate portion, a first end portion of greater diameter than the intermediate portion and a second end portion of greater diameter than the first end portion with a first pilot passage discharging through the wall of the first end portion and a second pilot passage discharging through the wall of the second end portion and first and second main air passages longitudinally spaced and entering through the wall of the intermediate portion, an air inlet communicating directly with the first pilot passage and the first main passage, a delivery passage communicating with the second main air passage and a pilot valve receiving chamber communicating said air inlet with said second pilot passage and provided with a pilot valve seat between said air inlet and said second pilot passage, a piston slidably mounted in said cylindrical passage for movement from a first position to a second position, said piston having a first end in sealing engagement with the wall portion of the first end portion of said passage and a second end in sealing engagement with the wall of the second end portion of the passage and having an air passage in its intermediate portion, a sealing means carried by the valve body arranged around said piston between the points the first and second main air passages enter through the wall of the intermediate portion of said cylindrical passage said sealing means making a seal with the piston when it is in its first position and permitting air to flow from the first to the second main air passage when the piston is in its second position, a pilot valve member arranged in said pilot valve receiving chamber of the valve body and longitudinally movable from a closed position to an open position in contact with said pilot valve seat, said valve member controlling the flow of air from the air inlet to the second pilot passage and a valve operating means carried by the valve body having an operating member with a bleeder port extending therethrough having an entrance adapted to communicate with the second pilot passage, the entrance to the bleeder port being adjacent the pilot valve member and the operating member being movable from a first position out of contact with the pilot valve member to a second position in contact with said pilot valve member to push it from its seat whereby the entrance to the bleeder port is closed, and upon the return of the operating member to its first position, air is bled from the second end portion through the bleeder port of the operating member.

2. A device in accordance with claim 1 in which the operating member protrudes from the valve body and is exposed to be moved mechanically.

3. A device in accordance with claim 1 in which a diaphragm assembly is carried by the valve body and mechanically coupled to the valve operating member to operate it.

4. A device in accordance with claim 1 in which a piston and cylinder assembly is carried by the valve body with a piston mechanically coupled to the valve operating member to operate it.

5. A valve assembly comprising, in combination, a valve body having a first cylindrical passage with coaxial cylindrical walls with an intermediate portion, a first end portion of greater diameter than the intermediate portion and a second end portion of greater diameter than the first end portion, the valve body having an air inlet passage communicating with a first pilot passage which discharges through the wall of the first end portion of the first cylindrical passage, and a first main air passage which enters through the wall of the intermediate portion of the first cylindrical passage and having a delivery port which communicates with a delivery passage which enters through the wall of the intermediate portion of the first cylindrical passage and longitudinally spaced from the point of entry of the first main air passage, said valve body having a second cylindrical passage with a first end in communication with the air inlet passage, the valve body having a second pilot passage communicating a port discharging through the wall of the second cylindrical passage with a port discharging through the wall of the second end portion of said first cylindrical passage, a dumbbell shaped piston slidably mounted in the first cylindrical passage and movable from a first position to a second position with a first end in sealing engagement with the wall portion of the first end portion of said passage and a second end larger than the first end and in sealing engagement with the wall of the second end portion of the passage and having an air passage in its intermediate portion, first, second and third sealing rings encircling the intermediate portion of the piston and mounted in the valve body, the first ring being mounted between the first end portion and the first main air passage and sealing with said valve body at all times, the second sealing ring being mounted between the first main air passage and the delivery passage and sealing with said piston when the piston is in its first position but having an air passage between it and the piston when the piston is in its second position and the third sealing ring being mounted between the delivery passage and the second end portion and making a sealing engagement with said piston body when said piston is in its second position, a pilot valve assembly carried by said body arranged in said second cylindrical passage, said pilot valve assembly having a pilot valve body with a passageway fluidly connecting the the air inlet with the second pilot passage and having a seat in said passageway and a discharge port discharging said passageway to the atmosphere, a movable pilot valve member mounted in said passageway of said pilot valve body to contact said seat, a spring arranged in said pilot valve body around the pilot valve member to bias it against said seat, a longitudinally movable valve operating member with a bleeder port extending therethrough mounted in said pilot valve body, the entrance to the bleeder port being adjacent the valve member of the pilot valve assembly and the operating member being movable from a first position out of contact with the valve member to a second position in contact with said valve member to push it from its seat and close the bleeder port whereby the entrance to the bleeder port is closed, and upon the return of the operating member to its first position, air is bled from the second end portion through the bleeder port of the operating member.

6. A device in accordance with claim 5 in which the operating member protrudes from the valve body and is exposed to be moved mechanically.

7. A device in accordance with claim 5 in which a diaphragm assembly is carried by the valve body and mechanically coupled to the valve operating member to operate it.

8. A device in accordance with claim 5 in which a piston and cylinder assembly is carried by the valve body with a piston mechanically coupled to the valve operating member to operate it.

9. A device in accordance with claim 1 in which the piston has two spaced grooves and in which a releasable latch is carried by the valve body arranged to engage releasably one of said grooves when the valve is in its first position and to engage releasably the other of said grooves when the valve is in its second position.

10. A device in accordance with claim 5 in which the piston has two spaced grooves and in which a releasable latch is carried by the valve body arranged to engage releasably one of said grooves when the valve is in its first position and to engage releasably the other of said grooves when the valve is in its second position.

ROBERT R. CROOKSTON.

References Cited in the file of this patent

UNITED STATES PATENTS

| Number | Name | Date |
|---|---|---|
| 1,627,628 | Anderson | May 10, 1927 |
| 1,767,039 | Anderson | June 24, 1930 |
| 1,914,645 | Power et al. | June 20, 1933 |
| 2,273,856 | Freygang | Feb. 24, 1942 |